Feb. 5, 1929.
W. C. JONES
1,701,304
STEEL LUMBER
Filed Aug. 12, 1926     3 Sheets-Sheet 1
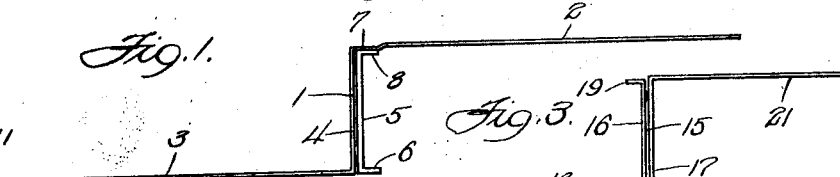
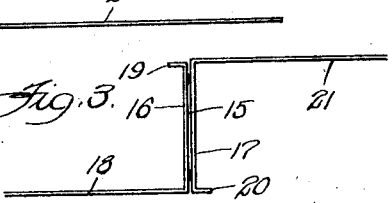
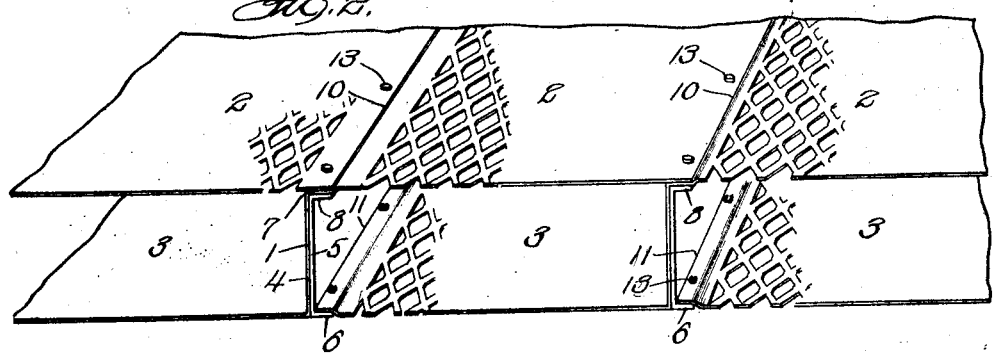
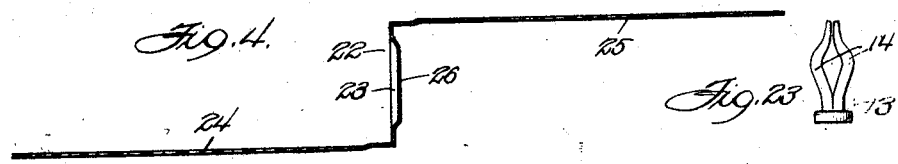
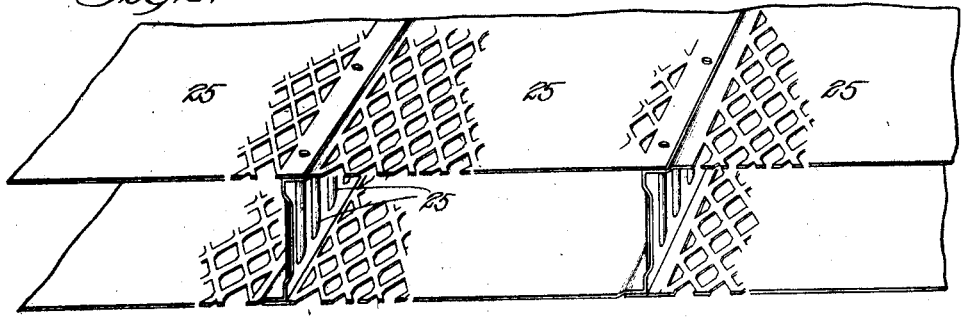
Inventor:
WALTER CLYDE JONES
By Jones, Addington, Ames & Seibold
Attys.

Feb. 5, 1929.                                                      1,701,304
W. C. JONES
STEEL LUMBER
Filed Aug. 12, 1926                  3 Sheets-Sheet 2
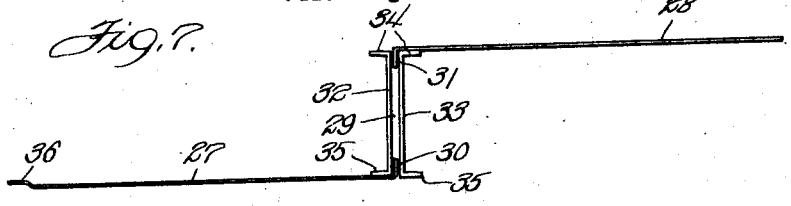
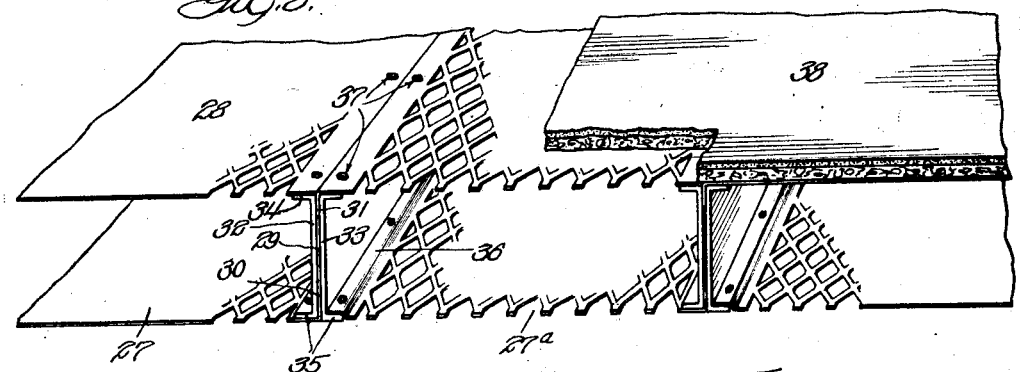
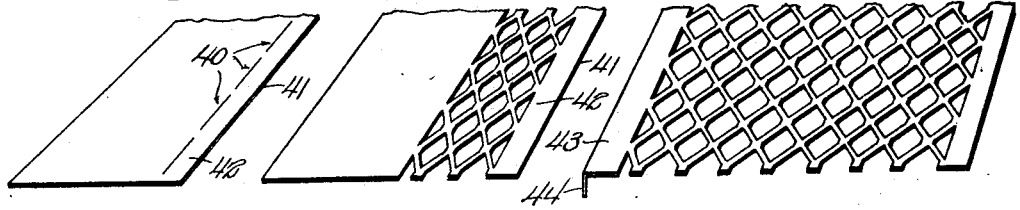
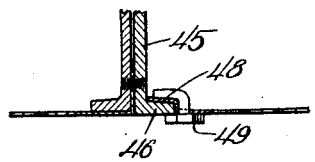
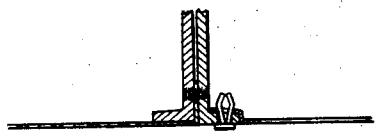
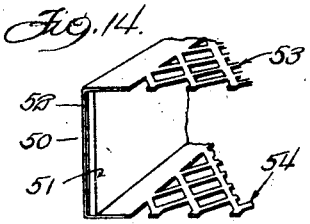
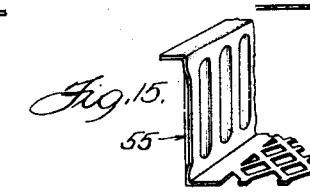
Inventor:
WALTER CLYDE JONES
By Jones, Addington, Ames & Seibold
attys.

Feb. 5, 1929. 1,701,304
W. C. JONES
STEEL LUMBER
Filed Aug. 12, 1926 3 Sheets-Sheet 3
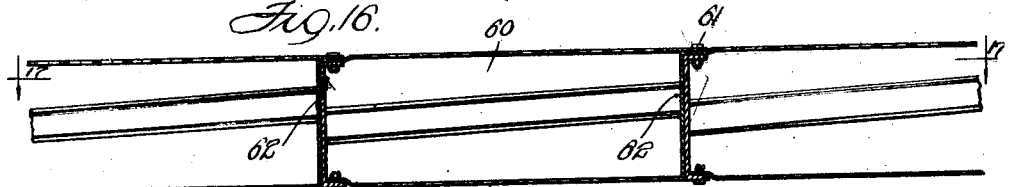
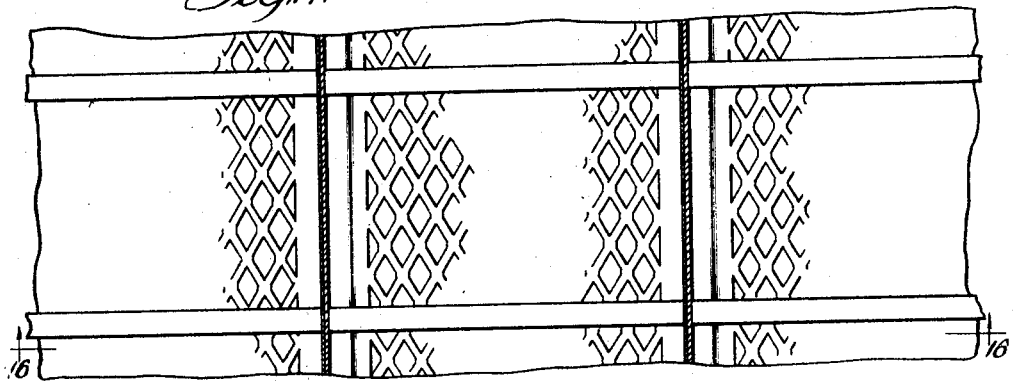
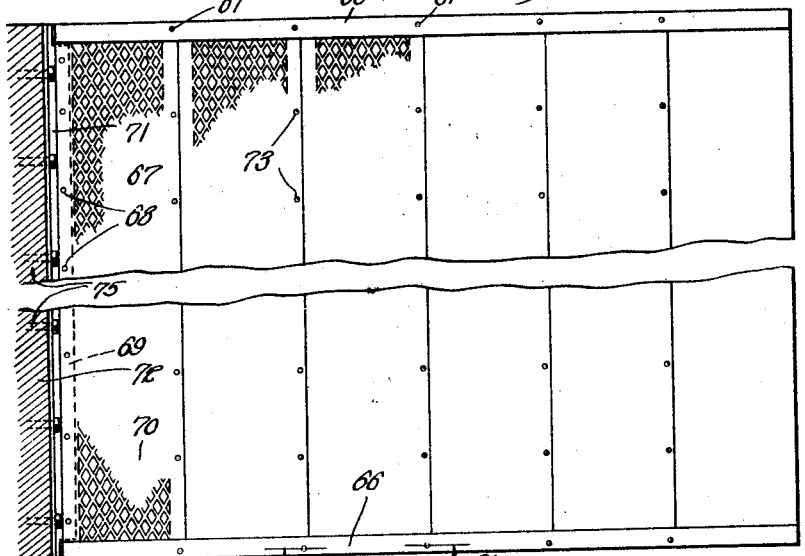
Inventor:
WALTER CLYDE JONES Patented Feb. 5, 1929.

1,701,304

UNITED STATES PATENT OFFICE.

WALTER CLYDE JONES, OF EVANSTON, ILLINOIS; WALTER CLYDE JONES, JR., EXECUTOR OF SAID WALTER CLYDE JONES, DECEASED.

STEEL LUMBER.

Application filed August 12, 1926. Serial No. 128,758.

My invention relates to steel lumber.

More particularly my invention has special reference to steel lumber construction embodying certain improvements over the forms of fabricated unitary sections shown and described in my copending application, Serial No. 63,217, filed October 19, 1925. The present invention aims primarily to provide a simpler, lighter, more economical form of steel lumber section and more economical structure.

Steel lumber sections of the character indicated may be fabricated into completed form at the factory and constitute a self contained unitary structure that will serve either as a stud and exterior and interior lathing, or as a joist and associated lathing or flooring, or as any other combination of weight supporting studding portion and relatively thin sustaining plate portions of a building construction.

By means of my present invention, steel lumber sections of the aforesaid character may be conveniently and economically manufactured, and may be readily handled and installed to serve as a substitute for the wooden members that have heretofore entered into building construction.

In accordance with my present invention, I construct a steel lumber section of the character described having thin sustaining plate portions formed of expanded metal held taut in any suitable manner in the assembled structure, thereby reducing to a minimum the amount of metal necessary for the construction of the lumber section.

In the preferred form of my invention I make the entire lumber section from a single sheet of thin metal bent to form a corrugated or otherwise reinforced studding portion and either one or two sustaining plate portions extending at right angles thereto and formed of expanded metal.

In order to apprise those skilled in the art how to construct and practise my invention, I shall describe several alternative embodiments of my invention, in connection with the accompanying drawings, which form a part hereof.

In the drawings:

Figure 1 is a cross sectional view showing a Z-shaped self contained and unitary steel lumber combination section embodying one form of my invention;

Fig. 2 is a perspective view showing the method of assembling the lumber sections of Fig. 1 in a buliding construction;

Fig. 3 is a modified form of the steel lumber section of Fig. 1;

Fig. 4 is a view illustrating the steel lumber section with means for reinforcing the studding portion;

Fig. 5 is a perspective view showing the manner of assembling the lumber sections in a building construction;

Fig. 6 is a cross sectional view through the reinforced studding portion;

Fig. 7 shows another form of the steel lumber section;

Fig. 8 is a perspective view showing the manner of assembling this form of lumber section;

Fig. 9 is a detail view illustrating the relative size of a sustaining plate portion before expanding takes place, and also the method of forming a marginal edge for fastening purposes;

Fig. 10 is a similar view with a portion of the sustaining plate portion expanded;

Fig. 11 is a view of the sustaining plate portion fully expanded;

Fig. 12 is a detailed view showing means for attaching adjacent steel lumber sections to each other in a building construction;

Fig. 13 is a similar detailed view of another form of attaching means for connecting adjacent steel lumber sections together;

Fig. 14 is a perspective view showing a modified form of unitary steel lumber section of U-shape;

Fig. 15 is a similar view of an L-shaped steel lumber section;

Fig. 16 is a detailed view of a plurality of assembled steel lumber sections looking edgewise thereof to illustrate the compression members that may be employed to stretch the steel lumber sections apart and hold the expanded metal portions taut;

Fig. 17 is a sectional detailed view looking sidewise at the aforesaid members;

Fig. 18 is a perspective view of one form of compression member employed;

Fig. 19 is a perspective view of another form of compression member;

Fig. 20 is a view of a plurality of assembled steel lumber sections with alternative means for holding the expanded metal parts taut;

Fig. 21 is a sectional detailed view taken on line 21—21 of Fig. 20;

Fig. 22 is a side view of the structure shown in Fig. 20; and

Fig. 23 is a view of a fastening bolt or pin employed herein.

The term "studding portions" as used herein contemplates a relatively strong or heavy weight, load or stress supporting portion of a steel lumber section used as a joist, stud or the like. The terms "sustaining plate portion," "lathing portion" and "flooring" are used synonymously and comprise the laterally extending portion spanning the space between adjacent lumber sections and adapted to form the flooring; the lathing, either external or internal, on the ceiling or side walls and the like. These elements of the steel lumber section are relatively thin and light in comparison to the studding portion and are of sufficient width, in conjunction with the adjacent lumber sections when installed to span the space between adjacent studding portions.

Referring to Figs. 1 and 2, the permanently organized self contained unitary steel lumber combination section comprises a relatively thick or reinforced weight supporting studding portion 1 and two sustaining plate portions 2 and 3 that extend laterally and in opposite directions from the studding portion 1 and adjacent to its edges. The sustaining plate portion 3 is made of expanded metal constituting a light open mesh construction, and may serve as lathing for a ceiling or a side wall; the sustaining plate 2 may likewise serve as lathing for a ceiling or wall or, in the position shown, for a flooring. The steel lumber section is built up in the preferred form of a light piece of material of uniform thickness, bent at right angles to provide an intermediate transverse portion 4 constituting the studding portion 1 and two laterally extending plates constituting the sustaining plate portions 2 and 3. Strength may be imparted to the studding portion by making it of thicker metal by addition of a reinforcing member, by corrugating the same, or the like. In the steel lumber section illustrated in Figs. 1 and 2 a reinforcing channel member 5 of suitable thickness and strength may be attached to the studding portion 4 in any preferred manner, say, as by spot welding as shown in Fig. 1. A bent over portion 6 serves as an exposed flange formed upon the studding portion 1 of the lumber section. Flange 6 projects from the studding portion 1 opposite to the lathing portion 3 and has its lower surface preferably coplanar with the lower surface of the lathing portion 3. At the opposite end of channel member 5, a similar flange 8 may be formed, but spaced below the upper surface of the sustaining plate 2 to permit this plate to have a recess or depression 7 formed therein in order that the outer edge of the flooring portion of the next adjoining lumber section may rest upon the depressed portion and, at the same time, permit of the flooring portion of the adjoining lumber section being in the same plane as the flooring portion 2, as shown in Fig. 2.

The lumber section of Fig. 1 is fabricated completely, preferably before installation at the factory, to constitute a permanently organized steel lumber section, and consequently, may be shipped, handled and installed as a single unit without necessitating any riveting, welding, or other operations performed by skilled labor on the job when incorporating it into a building.

As I have hereinbefore explained the studding portion 1 may be formed by placing the members 4 and 5 back to back and spot welding them together, but it is obvious that these members may be secured together in any other suitable way.

In Fig. 2, the steel lumber sections of Fig. 1 are shown in assembled position in a building construction. The sustaining plate portion 2 may constitute a coplanar surface that may serve, if desired, as the flooring of the upper level. Likewise, the sustaining plate portions 3 are coplanar and, by reason of being made of expanded metal with proper fastening margins and the metal maintained taut, may serve as lathing for the ceiling of a lower story of the building. The studding portions serve as the weight supporting elements of the lumber sections and assist by virtue of their rigidity to hold the expanded metal of the sustaining plate portions taut. The outer edges 10 of the upper sustaining plate 2 of each lumber section are received and supported in the recessed portions 7 formed in the adjacent sustaining plate 2, so that the flooring portions 2 may form a continuous coplanar surface. The lathing portions 3 are provided at their outer edges with offsets 11, and, when the lumber section is in assembled position, this offset 11 rests upon flange 6 on the studding portions 1 of the next adjacent lumber section. In this fashion, the sustaining plate lathing portions 3 are supported at their outer edges upon the studding portions of the adjoining lumber sections.

The overlapping edges 10 and 11 of the upper and lower adjoining sustaining plate portions 2 and 3 may be securely fastened to adjacent steel lumber sections in any desired manner, as shown for instance in Fig. 2, in which bolts 13 have split resilient legs 14 which will spread and hold the bolts in position upon being drawn through suitable holes in the overlapping sections. Other methods or forms of fastening can be employed if desired. Fastening means of various kinds are shown in my aforesaid copending application and also in another copending application, Serial No. 64,767, filed September 26, 1925.

The steel lumber sections may be made into standard lengths, viz, 12 feet, 14 feet, 16 feet, or the like, corresponding to the standardized lengths in which wooden lumber heretofore employed in building construction has been furnished. In conformity with standard dimensions and spacing of members employed in building construction, when wooden lumber is utilized, the studding portion 1 may, for illustration, be from 4″ to 6″ wide or larger, and about ⅛″ more or less in thickness and the expanded metal sustaining plate portions 2 and 3 may be 12″, 16″, 24″ wide, or like, and $\frac{1}{32}$″ more or less in thickness. It may be desirable to space the studding portions of adjacent lumber sections greater or less distances from each other than those mentioned and also the depth of the studding portions may be increased or decreased, as desired, as well as the thickness of the parts. The same comments pertain to the dimensions herein specified for the expanded metal sustaining plate portions. All dimensions given are merely illustrative.

In Fig. 3, I have shown a modified form of the steel lumber section in which the relatively thick studding portion 15 is built up of two thicknesses of metal 16 and 17, which may be permanently secured together by means of spot welding, or the like. The portion 16 is formed from a plate of uniform thickness comprising a thin expanded metal sustaining plate portion 18 and a flange 19. Similarly the portion 17 is formed from a plate of uniform thickness comprising the thin expanded metal portion 21 and the flange 20. While it is not necessary, I prefer to make these members of uniform thickness because a simple, relatively light and economical steel lumber section can thereby be produced.

In Fig. 4 I show means for reinforcing the studding portion without employing a separate reinforcing member. The section 22 may be formed from an integral sheet of metal of uniform thickness and bent to provide a central studding portion 23 and one or more expanded metal portions 24 and 25. The portions 24 and 25 are expanded, either before or after the bending of the lumber section to form the central studding portion 22. The section may be reinforced at the studding portion 23 by the formation of a series of suitable corrugations 25 which stiffen or strengthen the metal. If used in a partition wall the corrugations 26 will impart sufficient strength to the studding portion to carry the load. If used as a rafter, as where these steel lumber sections are assembled to constitute a ceiling and a floor, it may be preferable to employ other types of reinforcing means, as, for instance, those shown in Figs. 1 to 3, inclusive.

The manner or means employed to reinforce the central weight carrying studding portion 22, if reinforced at all, is a matter of choice, depending on the conditions of use and the load to be supported.

In Fig. 5, the lumber sections of Fig. 4 are shown in assembled position in a building construction. The sustaining plate portions 24 and 25 by virtue of their expanded formation, may serve as lathing to receive the wall plaster. The structure will constitute a relatively light and strong, but comparatively economical wall. The corrugating operation may be readily performed at the factory or in the original rolling of the sheet to provide sufficient strength to the studding portion without requiring separate members and the sustaining plate portions in their expanded relation will require a minimum amount of material.

In Figs. 7 and 8 I have shown another form of lumber section employing the expanded metal for the sustaining plate portions 27 and 28. The self contained built-up unitary steel lumber section shown in Fig. 7 comprises a central studding portion 29. Herein, the sustaining plate portions 27 and 28 are formed from separate relatively thin plates which are bent at their edges to form upstanding flange portions 30 and 31, respectively. The flanges 30 and 31 are received between two members 32 and 33, each being provided with flanges 34 and 35. The members 32 and 33 are positioned back to back with the flanges 30 and 31 interposed between them and all are permanently secured to one another, preferably by spot welding in order to form a relatively strong weight supporting studding portion for the steel lumber section. The flanges 34 and 35 of each member 32 and 33 project outwardly in the same direction from the studding portion, and the lower flange 35 of member 32 is depressed a distance equal to the thickness of sustaining plate portion 27, so that this plate portion 27 is coplanar with the flange 35 on member 33. The lower sustaining plate portions 27, 27ª, etc., are offset at 36 to overlap flanges 35 on members 33, so that these plate portions are also coplanar to provide a continuous wall of expanded metal lathing. Various ways of securing the different parts of the building construction shown in Fig. 8 may be employed, and hence, I do not desire to be limited to the use of expansion bolts or pins 37 shown in this figure.

The assembled structure comprising the unitary permanently organized expanded metal sections shown in Fig. 7 may be employed either for the flooring and cooperating ceiling on the underside between different levels in a building, or for partition walls between rooms. When the portions 28 are used for flooring in a modern fireproof reinforced concrete building, the expanded metal sustaining plate portions may serve as lathing for the concrete floor 38.

Referring to Figs. 9 to 11, inclusive, expanded metal may be generally described as metal openwork, held together by uncut portions of the metal, and constructed by making cuts or slashes in metal in any one of a variety of ways well known in the art, and then opening them so as to form a series of meshes. In its simplest form sheet metal may be expanded by making a series of cuts or slits 40 in the metal (see Fig. 9) by a suitable tool in such relation to each other as to break joints, so that the metal, when opened or stretched, will present the open mesh appearance seen in Figs. 10 and 11. These figures illustrate substantially the operations in expanding metal. When forming the sustaining plate portions constituting part of my steel lumber sections, a piece of metal of a width considerably less than the expanded product is employed leaving the metal unexpanded as beyond the line 40 to leave a suitable margin 42, which may be used for the purpose of fastening the sustaining plate portions to the central studding portions where built up of several pieces, and also to the adjacent lumber sections during assembling. Fig. 10 illustrates a portion of the metal piece of Fig. 9 expanded. Fig. 11 illustrates the expanded product. It will be observed that in this instance margins are provided along both edges and that adjacent to the margin 43, any suitable depending flange 44 may be provided to secure the plate portion to the central studding portion. Where the unitary lumber section is made from an integral piece of metal, such as I have shown in Figs. 1 and 4, the flange 44 will be omitted and the studding portions 4 or 22 formed instead, by suitable bending operations.

In Figs. 12 and 13, I have shown different means for connecting the sustaining plate portions along the fastening margins 42 to the studding portion of an adjoining lumber section. In Fig. 12, the studding 45 is provided at its lower edge with a flange 46 having an inclined upper face. Flange 46 therefore serves in the nature of a wedge and the outer edge 48 is offset, as shown in Fig. 12, which rests upon flange 46. The fastening member 49 is provided with a bent-over shank portion which is projected through an opening formed in the sustaining plate portion. The manner of assembling the parts when fastening member 49 is employed will be clearly apparent by referring to my copending application, Serial No. 63,217. The fastening device shown in Fig. 13 is in the form of an expansion bolt or split pin previously described and can be readily employed to advantage in steel lumber structure. It can be driven through the holes in the overlapping parts and the split resilient members will give to allow the passage of the split members after which they will spread apart to lock the pin in position.

In Fig. 14 I have illustrated the lumber section as U-shaped instead of Z-shaped. Herein, the studding portion 50 may be reinforced by permanently fastening, as by welding or otherwise, a separate plate 51 to the center transverse portion 52 of the U-shaped lumber section. In this form also thin material of substantially uniform thickness may be employed to form the expanded sustaining plate portions 53 and 54 and the studding portion 52, the sustaining plate portions being expanded as previously described, and serving as lathing for the walls, or floors or partitions.

In Fig. 15, the steel lumber section 55 is illustrated as L-shaped. Here, also, material of substantially uniform thickness may be employed with expanded sustaining plate portions, as before, and corrugations for reinforcing or strengthening the studding portions. Obviously, many different shapes, arrangements and reinforcing means will suggest themselves to those skilled in the art in the practical embodiments of my present invention.

In order to hold the expanded metal sustaining portions taut when installed, I may employ stiffening or compression members which may be interposed or wedged between the studding portions of adjacent lumber sections. The maintaining of the expanded metal portions taut may be accomplished in a variety of ways. In Figs. 16 to 19, inclusive, I show compression members 60 that may be inserted endwise between the studding portions of adjacent steel lumber sections before the pins 61 are inserted, the expanded metal portions being lifted for this purpose, and after the pins 61 have been inserted the compression members, which may have bevelled or inclined ends may be wedged tightly into position by suitable tools inserted through the meshes of the expanded metal. Members 60 may be of I-beam, channel, or other formation, or may be simply cylindrical rods sufficient to provide the desired stiffening between the studding portions to hold the expanded metal taut when installed.

Instead of compression members as above described, end members 65 and 66 of channel bar or other shape may be employed to which the built-up steel lumber sections may be anchored to hold the expanded metal parts taut. The anchoring by means of split pins 61 or the like will result in similar stretching and maintaining taut of the expanded metal of the sustaining plate portions. Such a structure has been shown in Figs. 20 to 22, inclusive. Channel members 65 and 66 are anchored to or supported by the building walls in any suitable fashion and the steel lumber sections may be successively placed in position, and anchored to the end members 65 and 66 by means of the pins 61. The steel lumber sections may be thus erected between the end channel members 65 and 66 and as the fastening bolts or pins 61 and 73 are inserted, the expanded metal of the sustaining plate portions is pulled taut and maintained in this condition.

If the end steel lumber sections are anchored directly to the opposite walls of the building, the end members 65, 66 may be omitted. By anchoring the several sections together by the pins 73 and by anchoring the end sections 67 to the wall the entire structure can be stretched and maintained taut from wall to wall. For this purpose I have shown an angle plate 71 anchored by anchors 75 to the wall of the building to which the first or end steel lumber section may be secured.

While I have herein shown and described several embodiments of my invention, it is to be understood that these are typical and illustrative and not all inclusive and that I do not desire to be limited to the specific structures shown and described since many modifications may be made without departing from the spirit and scope of my invention as set forth in the appended claims.

I claim:

1. A self contained permanently organized steel lumber section adapted to be fabricated completely before installation constituting a unitary structure serving as a combination building element which comprises a central studding portion, and a laterally extending light weight plate portion that is expanded transversely of said studding portion in the form of an open mesh-work to impart to said plate portion a transverse dimension sufficient to span the space intervening between the studding portions of adjacent lumber sections, the outer edge of said open mesh-work being subtended by a solid marginal portion that serves as fastening means for the said plate portion to the adjacent lumber section.

2. A self-contained permanently organized steel lumber section adapted to be fabricated completely before installation constituting a unitary structure serving as a combination building element which comprises a central studding portion, and a laterally extending lightweight plate portion, said portions being of uniform thickness and said studding portion being corrugated in the direction of its depth and said plate portion being expanded transversely of said studding portion in the form of an open mesh work to impart to said plate portion a transverse dimension sufficient to span the space intervening between the studding portions of adjacent lumber sections.

3. A self-contained permannently organized steel lumber section adapted to be fabricated completely before installation constituting a unitary structure serving as a combination building element which comprises a central studding portion, and a laterally extending lightweight plate portion, said portions being of uniform thickness and said studding portion being corrugated in the direction of its depth and said plate portion being expanded transversely of said studding portion in the form of an open mesh work to impart to said plate portion a transverse dimension sufficient to span the space intervening between the studding portions of adjacent lumber sections, the outer edge of said open mesh work being subtended by a solid marginal portion that serves as fastening means for said plate portion to the adjacent lumber sections.

In witness whereof, I have hereunto subscribed my name.

WALTER CLYDE JONES.